C. N. BARTON.
SECTIONAL MACHINERY REPAIR WASHER.
APPLICATION FILED OCT. 11, 1918.
1,327,417.
Patented Jan. 6, 1920.
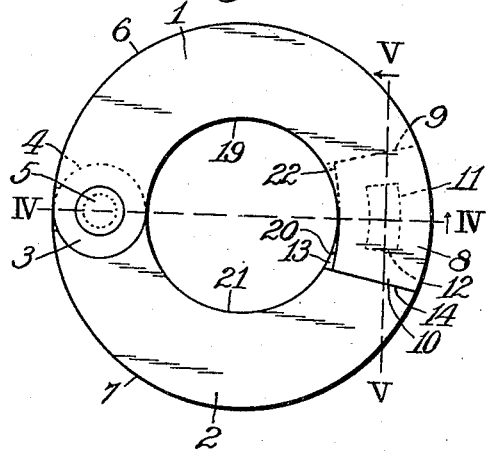
Fig. 1.
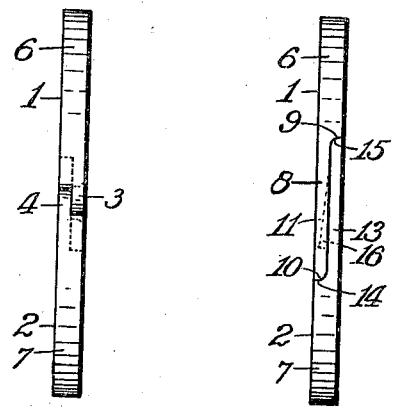
Fig. 2. Fig. 3.
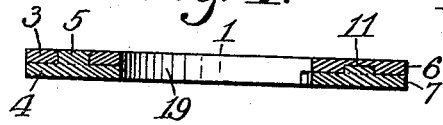
Fig. 4.
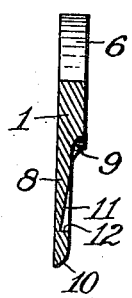
Fig. 8.
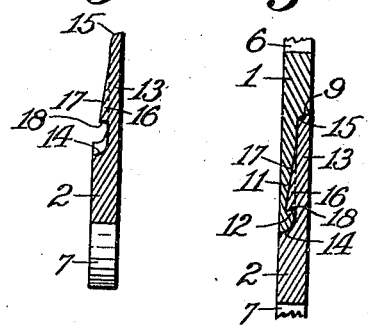
Fig. 5. Fig. 6. Fig. 7.
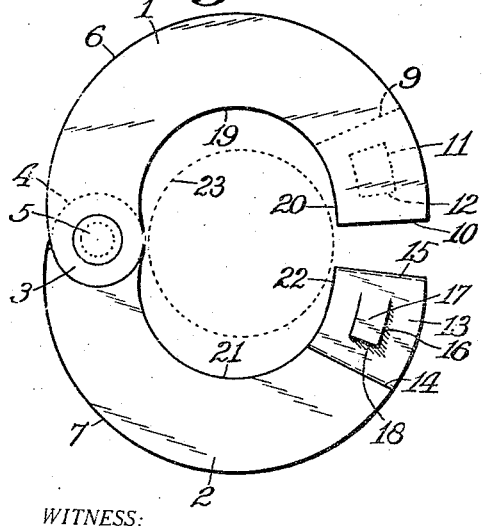
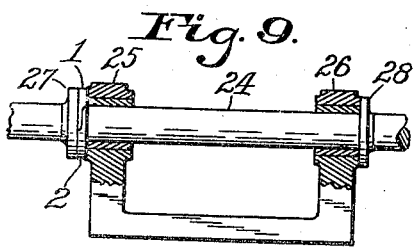
Fig. 9.
WITNESS:
Pearl Butler
F. M. Roeder
INVENTOR:
Charles N. Barton,
BY
E. D. Silvius,
ATTORNEY.

UNITED STATES PATENT OFFICE.

CHARLES N. BARTON, OF INDIANAPOLIS, INDIANA, ASSIGNOR OF ONE-THIRD TO JOHN W. LANGLEY AND ONE-THIRD TO WILL PEEK, BOTH OF INDIANAPOLIS, INDIANA.

SECTIONAL MACHINERY-REPAIR WASHER.

1,327,417.

Specification of Letters Patent. Patented Jan. 6, 1920.

Application filed October 11, 1918. Serial No. 257,761.

*To all whom it may concern:*

Be it known that I, CHARLES N. BARTON, a citizen of the United States, residing at Indianapolis, in the county of Marion and State of Indiana, have invented a new and useful Sectional Machinery-Repair Washer, of which the following is a specification, reference being had to the accompanying drawings and to the letters and figures of reference marked thereon.

This invention relates to a device that is designed for conveniently and cheaply repairing machinery which may be losing efficiency because of lost motion due to wearing of parts in use, the invention having reference more particularly to a washer that may be readily applied to a machinery shaft without necessitating the transportation of the machinery to a work shop or removing the shaft from its place in the machinery, to prevent inaccurate operation when the shaft has lost motion longitudinally.

An object of the invention is to provide a machinery repair washer of such construction as to be adapted to be placed on a rotary shaft as a thrust-bearing or to reduce longitudinal lost motion of the shaft, particularly in cases where a solid washer can not be slipped over an end of the shaft and moved longitudinally on the shaft.

Another object is to provide a sectional machinery repair washer which shall be so constructed as to be adapted to be cheaply produced and composed of sections so connected together as to permit the washer to be inserted between end or thrust-bearings, more particularly between a journal bearing and a collar to closely embrace a machinery shaft so as to fill surplus space between the journal bearing and the collar, particularly in agricultural machinery and when a collar may be found to be an integral part of a shaft or otherwise fixed thereto so as to be non-adjustable.

A further object is to provide a machinery repair washer which shall be so constructed as to be adapted not only to be readily applied in place but which shall be adapted to be readily removed to be replaced by a relatively thicker washer, and which shall be durable and economical in use and effect great saving in repair expenses.

With the above-mentioned and other objects in view, the invention consists in a sectional machinery repair washer of novel construction and application, and further consisting in the parts and combinations and arrangements of parts as hereinafter particularly described and further defined in the accompanying claims.

Referring to the drawings,—Figure 1 is a plan view showing one of the two relatively parallel sides of the washer as preferably constructed; Fig. 2 is an edge view of the washer; Fig. 3 is an opposite edge view of the washer; Fig. 4 is a section on the line IV—IV in Fig. 1; Fig. 5 is a fragmentary section showing one part of the washer on the line V—V in Fig. 1; Fig. 6 is a fragmentary section showing the companion part of the washer also on the line V—V; Fig. 7 is a fragmentary section showing the two parts locked or latched together also on the line V—V; Fig. 8 is a plan of the washer adjusted preparatory to being applied to or removed from a shaft; and, Fig. 9 is a side view of a journaled shaft to which the repair washer is applied as illustrating one of the purposes and mode of operation of the invention.

Similar reference characters in the different figures of the drawings indicate corresponding elements or features of construction herein referred to in detail.

The improved washer is composed of connected sections, preferably two sections, and in order that none of the sections may be misplaced or lost when not in use the sections are preferably hingedly connected together, there being two semi-circular sections 1 and 2 having hinge portions 3 and 4 respectively at one end thereof that are relatively thinner than the body portions of the sections and are placed in overlapping relation and connected together by a suitable hinge pin or pivotal stud 5 which preferably is integral with one of the hinge portions. The sections have convexly curved peripheral portions 6 and 7 respectively, so that the peripheral edge of the washer is approximately cylindrical. One of the sections has a relatively thin lock portion 8 of uniform thickness that extends from a shoulder 9 which is at the end of the body portion of the section, the lock portion being one-half as thick as the body portion and having a beveled end 10, the beveling being on the inner side of the lock portion. The rear or inner side of the lock portion is provided with a hook, the middle of the back of the lock portion having a recess 11 whose bottom is relatively inclined to an abrupt shoulder 12 which forms a small hook that faces approximately toward the shoulder 9. The companion section has a similar lock portion 13 that extends from a shoulder 14 formed at the end of the body portion of the section and has a beveled end 15 adapted to coöperate with the beveled end 10 when applying the washer, the rear or inner side of the lock portion being provided with a relatively small hook, the lock portion having a small lug 16 thereon whose face 17 is inclined, the thicker end 18 of the lug constituting the hook which is adapted to engage the shoulder or hook 12 while the recess 11 receives the body of the lug. The lock portions of the sections are of sufficient length to overlap one upon another, each section including the body portion and the hinge and lock portions thereof being longer circumferentially than one-half of the circular. One section has a concave inner edge 19 that is semi-circular and adapted to embrace one-half of a shaft, the inner edge of the lock portion 8 having a relatively beveled end portion 20, so that the end of the lock portion is narrower than the body portion thereof. The companion section has a concave inner edge 21 and the lug portion of the section has a beveled inner edge 22. The edge portions 20 and 22 may be tangential to the inner edge portions of the sections respectively or may be curved as segments of circles struck from the center of the hinge pin 5, so that the end portions 20 and 22 shall clear the shaft when the washer is applied thereto, as will be apparent by reference to Fig. 8 in which the dotted circle 23 represents a shaft to which the washer is to be closely fitted.

By reference to Fig. 9 a shaft 24 is seen as journaled in bearings 25 and 26 and provided with stop collars 27 and 28 to coöperate with the bearings respectively and prevent longitudinal movement of the shaft, the improved washer being represented as applied to the shaft between one of the collars and one of the bearings to take up lost motion which it is assumed has developed in the operation of the shaft.

In practical use the sections of the washer are swung apart sufficiently to permit the ends 10 and 15 to pass over the shaft transversely thereof until the hinged ends are brought into contact with the shaft, after which the beveled ends are brought together forcibly so as to cause overlapping contact of the lock portions, the inclined face 17 being brought into contact with the beveled end 10 which causes the lock portions to be sprung slightly apart until the thin lug drops into the recess 11 when the hooks 12 and 18 become locked together as the lock portions spring together, the washer being thus secured in the place desired on the machinery shaft. A washer of suitable thickness is to be applied that will permit slight longitudinal movement of the shaft necessary to prevent binding or development of heat, which is sufficient to permit the lock portions of the washer to be slightly sprung apart when applying or removing the washer. When the washer is secured in place its two opposite sides have parallel plane surfaces so as to insure smooth bearing.

Having thus described the invention, what is claimed as new is—

1. A machinery repair washer comprising a circular plate composed of two sections hinged together at one end, the opposite end of each section having an overlapping portion extending beyond the end of the arc of one-half of the circle, the inner edge of each overlapping portion extending tangentially from the half-circle arc of the inner edge of the section, said overlapping portions having devices to lock each portion to the other.

2. In a sectional machinery repair washer, the combination of two curved sections, each section being hingedly connected at one end to the other section and being longer circumferentially than a semi-circle but having its inner edge corresponding to the arc of a semi-circle extending from the hinged end of the section, each section adjacent to its opposite end having a relatively thin overlapping portion, each overlapping portion having an inner edge extending tangentially from the opposite end of said arc, the inner side of one of said overlapping portions having a relatively small lug thereon, the lug having an inclined face, the inner side of the remaining one of said overlapping portions having a shallow recess whose bottom is inclined to receive and retain said lug.

In testimony whereof, I affix my signature in presence of two witnesses.

CHARLES N. BARTON.

Witnesses:
E. T. SILVIUS,
F. M. ROEDER.